(12) United States Patent
Schmidt (10) Patent No.: US 8,803,709 B2
(45) Date of Patent: Aug. 12, 2014

(54) METHOD FOR PRESENTING SPATIAL ATTITUDE AND HEADING INFORMATION OF A VEHICLE

(75) Inventor: Sven Schmidt, Stuttgart-Degerloch (DE)

(73) Assignee: Airbus Helicopters Deutschland GmbH, Donauwoerth (DE)

( * ) Notice: Subject to any disclaimer, the term of this patent is extended or adjusted under 35 U.S.C. 154(b) by 255 days.

(21) Appl. No.: 13/314,276

(22) Filed: Dec. 8, 2011

(65) Prior Publication Data

US 2012/0154178 A1  Jun. 21, 2012

(30) Foreign Application Priority Data

Dec. 17, 2010  (EP) .................................... 10400064

(51) Int. Cl.
*G08B 21/00* (2006.01)
*G01C 23/00* (2006.01)
*G01C 21/00* (2006.01)
*B60Q 1/00* (2006.01)

(52) U.S. Cl.
USPC ........... 340/946; 340/974; 340/975; 340/977; 340/978; 340/441; 340/461; 701/465

(58) Field of Classification Search
USPC ......................................... 340/946, 974, 975
See application file for complete search history.

(56) References Cited

U.S. PATENT DOCUMENTS

| 3,967,236 | A | * | 6/1976 | Dietrich .................... 340/946 |
| 4,326,189 | A | * | 4/1982 | Crane ........................ 340/973 |
| 4,513,509 | A | * | 4/1985 | Nordstrom .................... 33/330 |
| 4,563,742 | A | | 1/1986 | McElreath |
| 5,095,746 | A | | 3/1992 | Stanis |
| 5,181,028 | A | | 1/1993 | Sharpe |
| 6,665,630 | B2 | | 12/2003 | Wei et al. |
| 7,224,311 | B2 | * | 5/2007 | Tanygin et al. ............... 342/443 |
| 8,344,911 | B1 | * | 1/2013 | Wenger et al. ............... 340/973 |
| 2005/0119802 | A1 | | 6/2005 | Kane |
| 2006/0080004 | A1 | | 4/2006 | Cheok et al. |
| 2009/0283027 | A1 | | 11/2009 | Cameron et al. |
| 2012/0026190 | A1 | * | 2/2012 | He et al. .................... 345/633 |

FOREIGN PATENT DOCUMENTS

EP    0383083 A1    8/1990

OTHER PUBLICATIONS

Search Report and Written Opinion; Application No. EP 10400064; dated May 16, 2011.

* cited by examiner

*Primary Examiner* — Jack K Wang
(74) *Attorney, Agent, or Firm* — Brooks Kushman P.C.

(57) ABSTRACT

A method of presenting attitude and heading information of a vehicle on a display to a viewer inside the given vehicle, comprising the steps of: using a 2D display, using data provided by an inertial reference system, using a computer and graphical software for treating the data and defining graphical elements, depicting the graphical elements in 3D on the 2D display, and presenting the attitude and heading information on the 2D display by associating them to at least one graphical element.

10 Claims, 4 Drawing Sheets

METHOD FOR PRESENTING SPATIAL ATTITUDE AND HEADING INFORMATION OF A VEHICLE

CROSS REFERENCE TO RELATED APPLICATIONS

This application claims priority to European application no. 10 400064.1 filed Dec. 17, 2010, the disclosure of which is incorporated in its entirety by reference herein.

BACKGROUND OF THE INVENTION (1) Field of the Invention

The present invention relates to the general technical field of equipments used for flight guidance.

The invention concerns more particularly a method for presenting attitude and heading information of a vehicle and artificial spatial attitude and heading indicators or instruments of vehicle.

(2) Description of Related Art

The term "vehicle" encompasses any type of aircrafts or spacecrafts.

Different terms are used and for which the meaning is given by the definitions as follows:

2D: two dimensional,
3D: three dimensional,
AHRS: attitude and heading reference system,
CDI: Course Deviation Indicator
EFIS: electronic flight information system,
Heading: Direction with reference to the magnetic field of earth, or with reference to any other horizontal information.
IFR: Instrument Flight Rules,
ROC: rate of climb.

The pilot of an aircraft needs in general many aircraft and environment data for taking the optimal decisions during his flight, especially in emergency situations. Among these data, there is for instance the aircraft attitude information such as pitch and roll information.

During the flight, the pilot should be aware of the instantaneous situation, such as e.g. altitude, airspeed and attitude under IFR conditions in order to determine the flight path and motion of the aircraft. The current state of the art equipments, however, cannot provide such instantaneous situation awareness. These known equipments, either providing inside-out or outside-in view, do not present the vehicle or aircraft's attitude in relation to the reference system, e.g. the orientation compared to the earth's surface.

It can occur that the pilot can see only the earth or only a blue sky in his primary flight display of the known equipments and that he cannot easily know in which direction he should steer to get a normal level of flight attitude.

By inside-out, one should understand that the aircraft symbol remains fixed while the background and horizon indicators move to indicate the aircraft attitude.

By outside-in, one should understand that the aircraft symbol moves in the same apparent direction as the aircraft is actually moving.

It is known to present horizontal information on a flat depiction in either inside-out or outside-in view. Both solutions lack a certain spatial orientation information as soon as the depiction limits are reached.

The depiction limits addressed with this invention are the fact that the projection of the 3D spatial situation on a flat area does reduce the information transmitted. The usual model to depict an attitude is to use a cylinder, sphere or similar which is divided into two equal parts. Both parts are painted in different colours, normally blue for the sky (upwards) and brown for the earth surface (downwards). When projecting this model onto the 2D screen area and taking into account that the object is not fully visible, but only a small viewport as selected by the designer of the artificial horizon, there are possible modes in which only one part of the model sphere is projected.

Those modes are lacking any information about the actual attitude or directions to correct the attitude. Means to overcome such situations have been developed in the past and lead to the introduction of flight director bars in the attitude indication.

A typical and known presentation of an artificial horizon will be for example an inside-out view projected onto a 2D (two dimensional) screen picture. The attitude indication provided by an inside-out view on a known artificial horizon has led to some abnormal situations and was so not considered as satisfactory.

Another kind of presentation currently used is an outside-in view, still projected on a 2D presentation.

The presentation of the 3D spatial orientation on a 2D projection lacks information as soon as the projection is full by either the sky or the earth. In such a case markings or other clues need to be added in order to provide the necessary orientation information for undertaking corrections. In high workload situations, such markings can easily be neglected by the crew as they might be occupied by other distraction coming from the aircraft or from the environment.

None of the above mentioned known indicators (inside-out or outside-in) are therefore satisfactory. Additional guidance information needs always to be introduced which is conclusive only after intensive training of the pilot.

An exemplary embodiment of a known attitude indicator is described in document U.S. Pat. No. 4,563,742, which discloses an attitude indicator combining the best features of both the inside-out and outside-in viewing modes. The aircraft symbol is positioned in accordance with the pitch of said aircraft and a horizon indicator is also positioned in accordance with the pitch of said aircraft. In this embodiment, there is a need of the two information elements, the pitch, which renders such a solution relatively complex. The drawback for this solution is the overlay of two moving elements, one representing the horizon, in order to provide the expected inside-out view and a movement of the aircraft pictorial, which will move in the opposite direction of the horizon. In addition, this principle is limited in feasibility to attitude situations which are not adverse, like e.g. nose fully up. Additionally the overlay of a moving object over the attitude presentation can result in misleading interpretation in case of high workload situations. The presented solution lacks also the immediate information about the corrective actions to be taken in adverse situations.

The document EP 0383083 A1 discloses an instrument with a fixed aircraft symbol and a reference system for flight-path control, in which information on the respective flight attitude is also integrated and thus flying manoeuvres can also be controlled at very high angles of attack.

Another exemplary embodiment of known attitude indicator is described in document U.S. Pat. No. 5,181,028, which discloses an attitude indicator with the use of shutter goggles and a fixed 3D aircraft presentation on a 3D display. The cost of such an instrument or indicator is therefore relatively high. This solution lacks simplicity as it requires several hardware items to work together. With malfunction of the goggles, which might not be feasible to be used during night flights, the crew is back to the classical presentation of attitude. Additionally the usage of goggles impairs problems and incompatibilities with other indicators in the cockpit, as it will filter wavelength or polarization, independently from the source of information, and has to be applied for usage with elements based on polarization, i.e. LCD displays.

BRIEF SUMMARY OF THE INVENTION

Consequently the objective of the present invention is to remedy the aforementioned disadvantages and propose a new, reliable and improved spatial attitude indicator.

The object of the invention is also to provide a new spatial attitude indicator which indicates the absolute spatial attitude in such a way that the pilot knows always in which direction he has to steer to reach a safe flight attitude.

The objectives of the invention are achieved by a method of presenting attitude and heading information of a vehicle, on a display to a viewer inside the given vehicle, comprising the steps of:

using a 2D display,
using data provided by an inertial reference system,
using a computer and graphical software for treating the data and defining 3D graphical elements,
depicting the 3D graphical elements on the 2D display,
and presenting the attitude and heading information on the 2D display by associating them to at least one graphical element.

By way of example, the method according to the invention consists of using roll and pitch data for the attitude information.

By way of example, the method according to the invention consists of using also yaw data for the attitude information.

By way of example, the method according to the invention consists of:

depicting a first graphical element as a transparent sphere representing a inertial reference system with respect of the inertial reference for the movement of the vehicle, the sphere comprising longitudinal and lateral markings on its surface representing direction and orientation references, an upper half sphere representing the sky and the lower half sphere representing the ground,
projecting movable heading information in response to variations in heading on the surface of the sphere,
using a second graphical element which is fixed with respect of the vehicle, representing a 3D reference symbol of the vehicle and/or its main axes and/or its orientation plane,
placing the reference symbol in the sphere,
moving the reference symbol inside the fixed sphere with regard to the vehicle's movement in the inertial reference system,
and depicting the graphical elements in a vehicle external observer viewing mode.

The depicted sphere is fixed to the instrument display but can allow adjustments by the crew if necessary. Those adjustments can include, but are not limited to, certain movement in of the sphere's projection on the 2D screen of the instrument display, zooming or information de-cluttering.

By way of example, the method according to the invention consists of:

depicting at the equator of the sphere a half circle ranging away from the viewer highlighting the artificial horizon on the surface of the sphere,
aligning the half circle to the reference symbol of the vehicle,
and keeping the sphere and its surface elements fixed to the inertial reference system while moving the reference symbol within the sphere in order to display the angles between the orientation plane and the half circle.

By way of example, the method according to the invention consists of displaying a current heading aligned to the straight forward direction of the vehicle and to place longitudinal markings of the sphere.

By way of example, the method according to the invention consists of using for the reference symbol an additional half sphere placed inside the sphere and whose spherical part is moving and whose plane surface constitutes the orientation plane comprising a vehicle representation.

By way of example, the method according to the invention consists of depicting a deviation from a course by shading an area of the sphere, ranging away from the viewer, lying between a longitudinal marking corresponding to the actual track and a longitudinal marking which corresponds to the selected course.

By way of example, the method according to the invention consists of depicting the sphere combined with steering information of the vehicle with respect of power information or other flight information of the vehicle.

By way of example, the method according to the invention consists of switching manually or automatically from one to another of the depicted 3D elements viewing mode and information to a conventional 2D artificial horizon representation or standard 2D projection mode.

By way of example, the method according to the invention is carried out on a helicopter. Other type or aircrafts, for instance fixed wing aircrafts, or spacecrafts, can also be steered with the help of the method according to the invention.

The objectives of the invention are also achieved with an artificial spatial attitude and heading indicator for a vehicle such as an aircraft or a spacecraft, comprising a 2D display, an inertial reference system, a computer and a graphical software for treating the data provided by the inertial reference system and for preparing the elements and information to be displayed, characterized in that the graphical software is a part of an avionic system for carrying out the steps of the above mentioned method.

An advantage of the method according to the invention lies in the direct spatial presentation of the vehicle's attitude while the crew member is still steering the inside-out part of the indication. It is a more intuitive presentation and supports the spatial orientation gathering especially in case of distraction or high workload, as the crew member will be in a third party observer position, which supports getting back the necessary overview for an abnormal situation.

An advantage of the artificial spatial attitude indicator conforming to the invention, resides in that it provides the pilot with reliable attitude information which do not require too many attention and/or expertise from the pilot. It will so enhance the awareness situation, especially in high workload situations. The safety can so be improved especially in adverse environment.

Another advantage of the spatial attitude indicator according to the invention lies in its use on any type of aircrafts, such as helicopters or fixed wings aircrafts.

Another advantage of the spatial attitude indicator according to the invention and of the method according to the invention, lies in the fact that there is no need to use any additional devices such as lenses or other special means for depicting a 3D representation of some elements on the 2D display.

BRIEF DESCRIPTION OF THE SEVERAL VIEWS OF THE DRAWINGS

The invention and its advantages will appear with greater detail in conjunction with the description which follows with execution and implementation examples, given as illustration and without limitation, with reference to the attached figures in which.

DETAILED DESCRIPTION OF THE INVENTION

The identical structural and functional elements, which are shown in several different figures or illustrations, are given one single numeric or alphanumeric reference.

Figure 1:
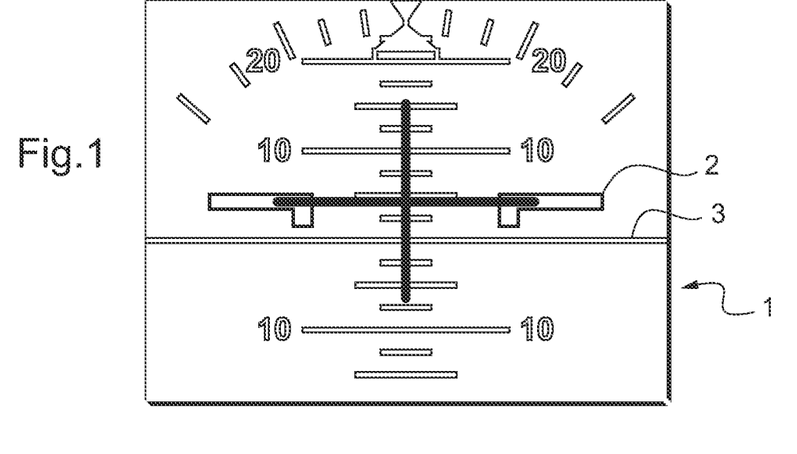
FIG. 1 illustrates an example of presentation of an known artificial spatial attitude indicator according to the state of the art.

In FIG. 1, an artificial spatial attitude indicator 1 of the state of the art comprises a fixed aircraft symbol 2 a horizon 3. As depicted in FIG. 1, the available field of view is approximately +/−20°. This leads to a loss of information as soon as the flight attitude is above or below this value. Especially if this situation is combined with a roll motion, a spatial disorientation can easily occur. Additional guidance needs to be introduced to overcome this problem. This would require intensive training for crew to undertake quickly the necessary flight corrections.

According to the invention, the artificial spatial attitude and heading indicator for a vehicle such as an aircraft or a spacecraft, comprising a 2D display, an inertial reference system, a computer and a graphical software or a graphic algorithm for treating the data provided by the inertial reference system and for preparing the elements and information to be displayed. The graphical software is a part of an avionic system for carrying out the steps of the above mentioned method.

The invention is so based on an implementation of an algorithm into a computer with an attached 2D display. Such an implementation can be done either by software or by specific design logic circuits, e.g. FPGA arrays.

Figure 2:
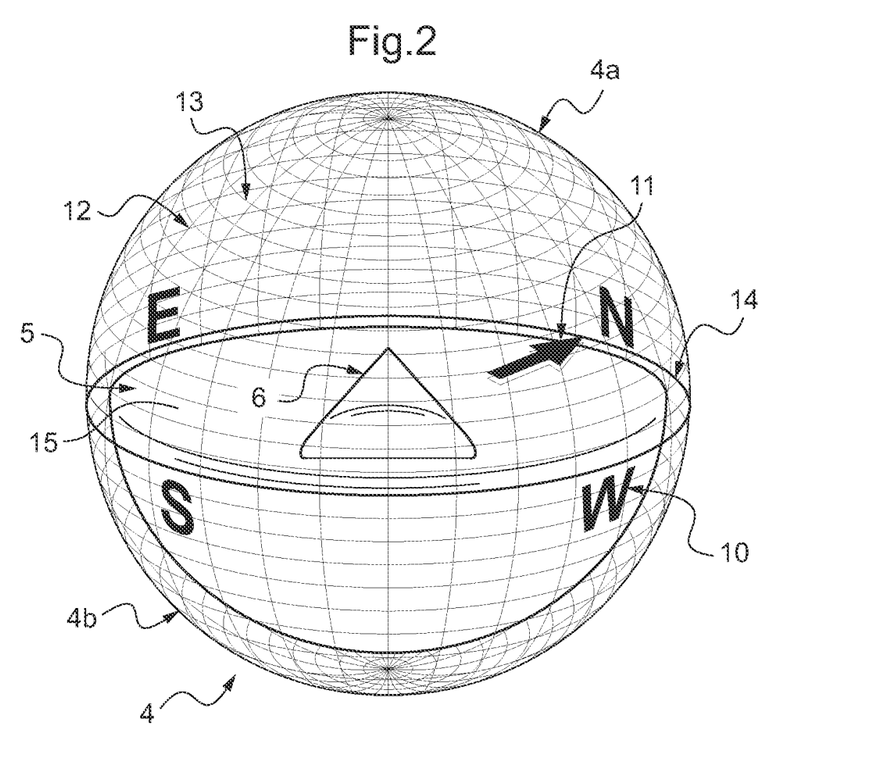
FIG. 2 illustrates an example of presentation of an artificial spatial attitude indicator according to the invention.

FIG. 2 illustrates an exemplary presentation of an artificial spatial attitude indicator according to the invention.

The indicator is based on a sphere 4 defining a reference system for the purpose of guidance. This reference system can include any useful or supportive information drawn to its surface. This information can be moving on the surface of the sphere as appropriate. The reference system is fixed the vehicle so that it will not move relative to the crew.

The reference system, i.e. the sphere 4 is divided into two half spheres 4a and 4b. The upper half sphere 4a is depicting the direction for the sky or towards a defined upwards reference or axis if applied to a spacecraft. However, the actual axes of the reference system (sphere 4) are not aligned to the actual attitude of the vehicle in relation to the real-world references. The orientation of the sphere 4 which is used as reference is fixed to the display, and therefore to the vehicle. The object moved is the depiction of the vehicle.

The lower half sphere 4b is depicting the direction towards the earth or towards a defined downward direction if applied to a spacecraft.

A reference symbol 5, e.g. a half sphere inside the sphere 4 or any other depiction of a vehicle, which should preferably be a 3D model of the vehicle itself, is placed inside the sphere 4 (reference system). An orientation symbol 6 of any kind, fixed to the reference symbol 5, is given to indicate the main axes of the vehicle and especially the straight forward movement direction of the vehicle.

The reference symbol 5 is aligned to the sphere 4 as the actual vehicle is aligned to the real world reference system. This is achieved by transforming an attitude determined by a vehicle based reference system in the coordinates of the spatial attitude indicator.

For instance, a level attitude is defined when the roll and pitch axis of the vehicle are located in the plan defined by the separation line between both spheres 4a and 4b. The rotation around these axes is determined by the measured attitude read from an AHRS system. This corresponds for instance to a normal attitude of the aircraft, depicted schematically on FIG. 7a.

Figure 3:
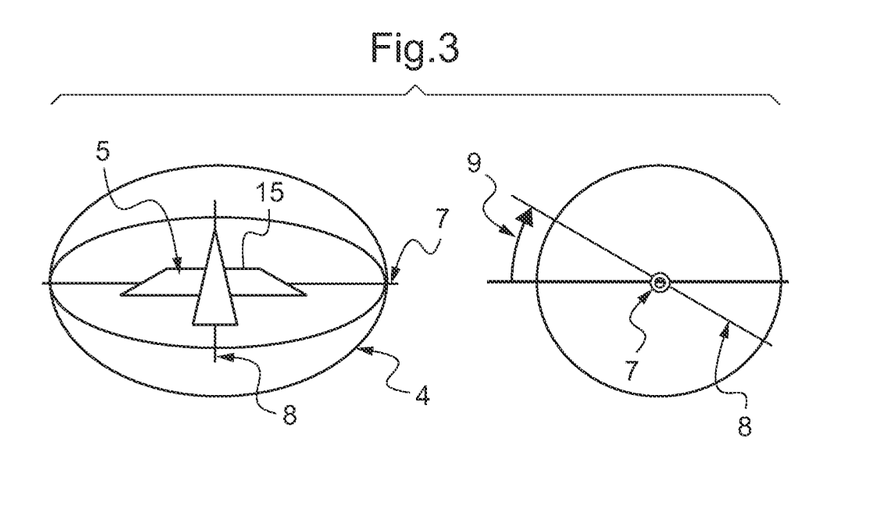
FIG. 3 illustrates an axis definition of an artificial spatial attitude indicator according to the invention.

FIG. 3 illustrates an axis definition of a spatial attitude indicator according to the invention.

The reference symbol 5 is fixed to the sphere 4 by means of two axes 7 and 8. The axis 7 which corresponds to an axis perpendicular to normal acceleration and to a vehicle's forward direction F is fixed to its relative position to sphere 4. The axis 8 is fixed in alignment parallel to the vehicle's forward direction and in the midpoint of axis 7. The axis 8 can rotate around the axis 8 at said midpoint.

The reference symbol 5 is fixed to both axes 7 and 8 such that its centre of rotation is located in the midpoint of axis 7. The depiction of the forward direction F is fixed and aligned to the axis 8 and can freely rotate around axis 7.

Figure 4:
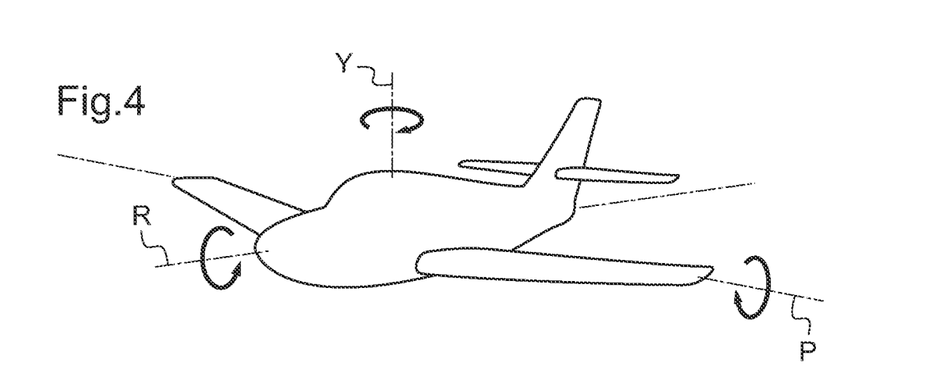
FIG. 4 illustrates a typical axis definition of a vehicle such as an aircraft.

An inclination 9 of axis 8, and thus of the reference symbol 5, is proportional to the inclination of the vehicle around the pitch axis as defined in FIG. 4 (axis P). The rotation of the reference symbol 6 around the axis 8 is proportional to the roll angle of the vehicle as defined in FIG. 4.

Alongside an equator of the sphere 4, a scale 10 can be presented which is slaved to a magnetic compass N,W,S,E or to any other direction or orientation reference direction. A pointer 11, which can move planar or spatial dependent on the application, can be shown pointing to a currently selected heading or reference. Further navigation aids, e.g. heading bugs, can also be included into the presentation.

The inclination of the indicator under which the indication is seen on the instrument display, which is the orientation of the sphere on the screen shall be selected in a way that maximum spatial situation information can be achieved. In order to achieve this, all available techniques to depict 3D elements or objects on a 2D screen (flat screen), like e.g. rendering, shading etc, can be used for finding the best solution for each individual vehicle.

A scale of the direction and/or orientation reference system shall be engraved as longitudinal markings 12 and lateral markings 13 into the surface of the reference sphere 4. The longitudinal markings are equidistant lines joining each pole of the sphere 4 and the lateral markings are equidistant and parallel lines which are orthogonal to the longitudinal markings 12.

Figure 6:
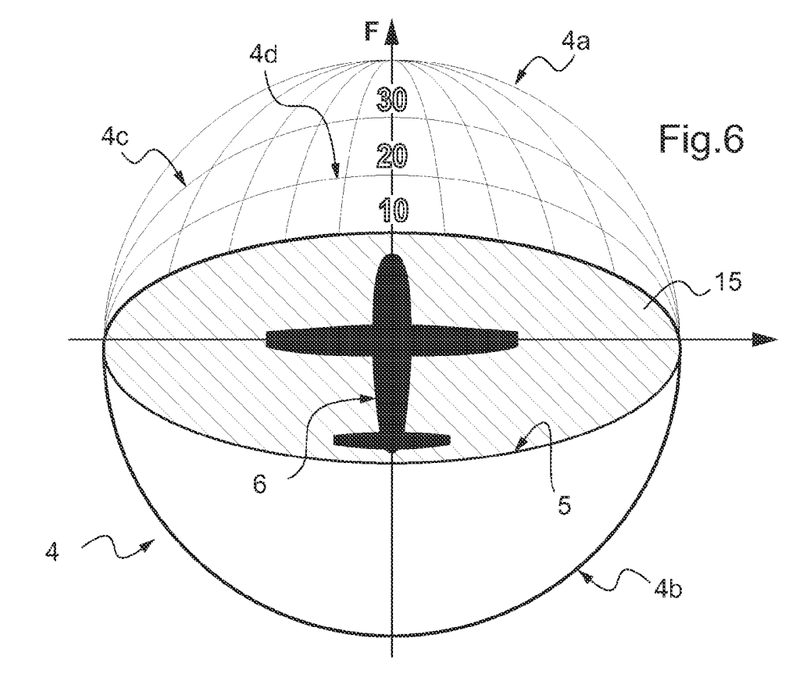
FIG. 6 illustrates an optional pitch scaling on a reference sphere of an embodiment of the artificial spatial attitude indicator according to the invention.

The pitch scale 4c as shown in FIG. 6 can either be static and be shown in any case or can be selectively hidden in order to de-clutter the presentation. The pitch scale 4c can e.g. be shown in the forward part of the sphere if the vehicle symbol 6 is below a certain value, in order to highlight the excessive attitude situation. Pitch scale markings 4d are preferably engraved on the pitch scale 4c as shown on FIG. 6.

The forward direction F is defined by the direction of the main movement of the vehicle, as selected by the manufacturer, or the direction in which the crew member in command is looking during normal flight attitude. On the indicator screen, forward is defined as looking from the screen surface into the equipment. Both directions must be aligned in order to use the proposed principle.

At the equator of the sphere 4, a half circle 14 is shown ranging away from the viewer. It is depicting the forward half intersection line between the sphere 4 (or reference system) and a transparent or semi-transparent plane of orientation 15 of the reference symbol 5.

The orientation plane 15 can be transparent and can have different colours, depending on the side on which the observer is looking at. The transparency will ensure that the half circle 14 can always be identified.

The reference symbol 5 is driven by the relative position and attitude of the vehicle with reference to a defined inertial system, either earth surface bound or any other. The rotation of the reference symbol 5 is bound to independent axes. For example these axes presented in attitude indicators would be the roll and the pitch axes. The new indicator according to the invention would be measuring the angles around said axes and rotating the reference symbol 5 in a corresponding manner, while the roll axis 8 is always parallel to the forward direction.

The reference symbol 5 virtual centre will always be at the same position.

A movement around a third axis, depicted in FIG. 4 as the yaw axis, shall be presented only as a movement of a radial scale located around the circumference of the sphere 4. This will reduce the complexity of the information.

The crew member is steering the reference symbol 5 in a way the vehicle would be naturally steered in order to control its position and attitude.

The reference source for rotation of the reference symbol 6 is an inertial reference system which can be defined by a local platform, e.g. an AHRS or by referring to a space based system, e.g. sun observation sensors.

The pointer 11 or directional reference is subject to de-clutter in case of excessive attitudes which have to be defined and based on the characteristics of the vehicle.

Figure 5:
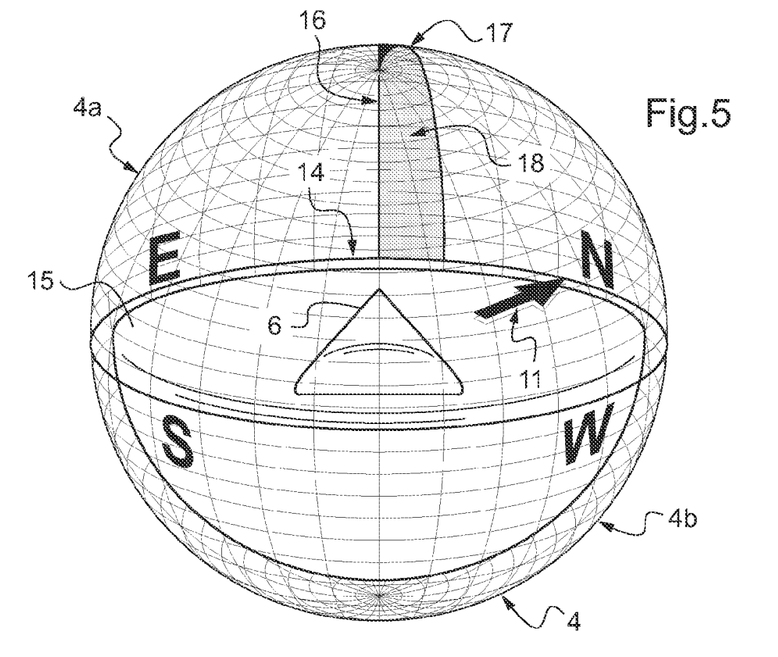
FIG. 5 illustrates an artificial spatial attitude indicator according to the invention, comprising a localizer indication.

FIG. 5 illustrates an artificial spatial attitude indicator according to the invention, comprising e.g. a localizer or a course indication 16.

According to the invention, the course or localizer indication 16 (line/symbol) is illustrated on the equator of the sphere 4. A deviation 17 from the course or localizer indication 16, can then be shown by shading an area 18 between the desired track corresponding to the course indication 16 and the deviation 17.

An indication 16 showing a course would be fixed to the selected course, hence the position of a course indication 16 is depending on the current orientation of the compass scale 10.

An indication 16 showing a localizer is always attached to the forward direction and does depict the localizer deviation by shading an area 18 between the localizer indication 16 and the current deviation 18. The current deviation 15 of a localizer is determined as on conventional localizer instruments.

The reference symbol 5 is always aligned to heading, i.e. the orientation of the vehicle with reference to magnetic north N. The compass rose, or equivalent, is always aligned to the heading, i.e. compass orientation, of the vehicle. Hence the compass rose will move around the equator of sphere 4 in order to keep the alignment. On the scale on the sphere 4, a line shall be displayed to show the course/localizer direction, and a second line or the shaded area shall be shown in order to show the course deviation 17 indication.

A localizer indication could be fixed to the forward middle part of the sphere 4. As a relative information between heading and desired track is not relevant for a localizer, as only a deviation from a guidance signal is shown and used for guidance, a CDI style depiction would be presented in a fixed position of the sphere 4. The CDI analogy indication is set up by using localizer indication 16 in fixed forward position and placing symbol 18 depending on the deviation from the localizer.

Alternatively orientation symbol 6 can be used to create the CDI. Orientation symbol 6 can be created by two parts, which are both aligned to reference symbol 5 as defined, where one part is used as desired track line the other part as deviation.

A glide-slope indication or any equivalent means can be introduced in a similar way.

In general, navigation information shall be de-cluttered as soon as a defined excessive attitude is reached or exceeded. In this case an automatic reduction of the presented information reduces the crew's workload and supports to get the attention back to the main indications.

Figure 7A:
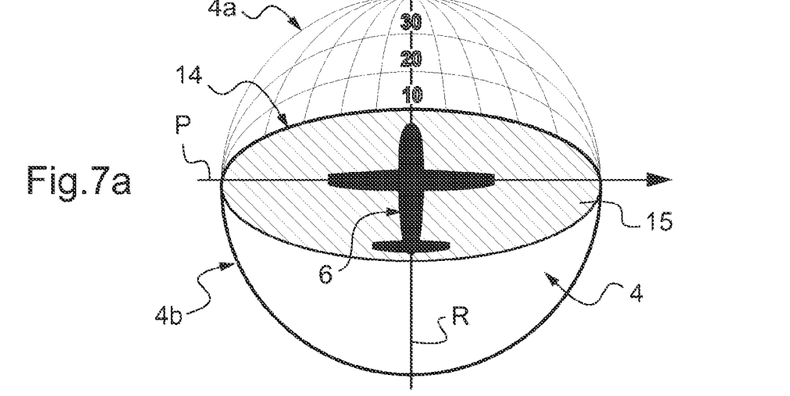
FIGS. 7a, 7b, 7c illustrate different attitudes as they would be indicated by an embodiment of the artificial spatial attitude indicator according to the invention.
Figure 7B:
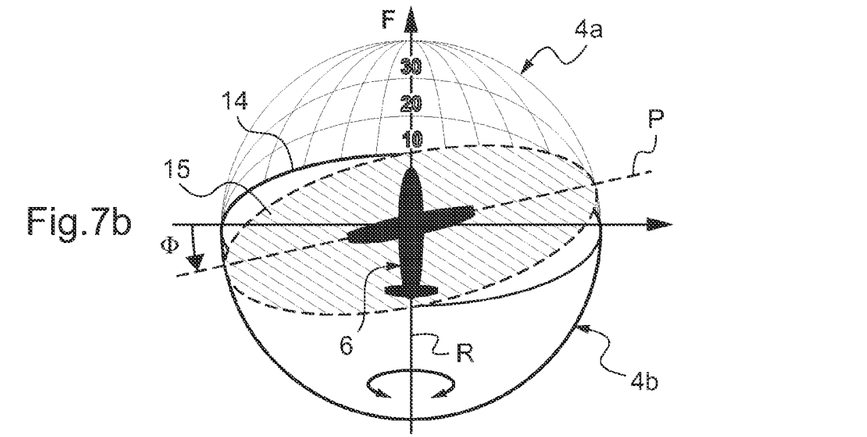
Figure 7C:
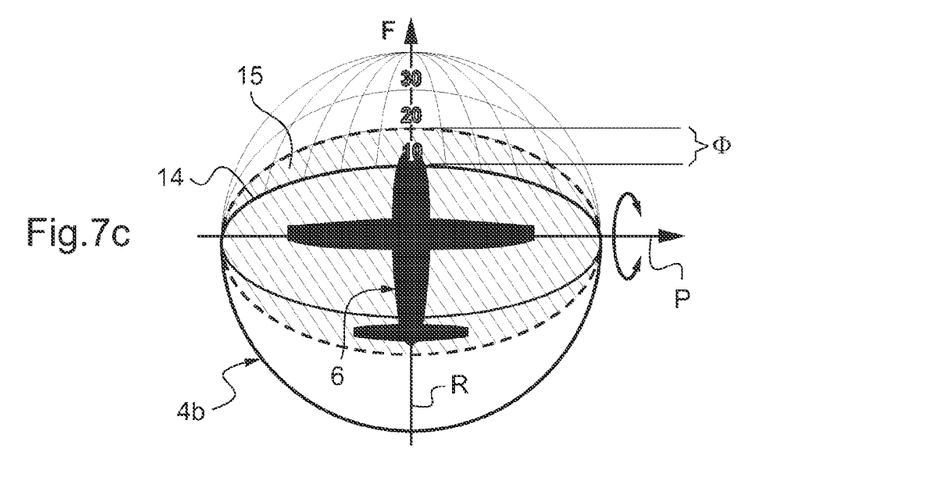

The FIGS. 7a, 7b and 7c show a few possible positions of the orientation plane 15.

In FIG. 7a, the aircraft or vehicle has a normal attitude. The orientation plane 15 extends along the equator of the sphere 4.

In FIG. 7b, the vehicle presents a left bank corresponding to an inclination (pivoting around the roll axis) with respect of the roll axis R. A bank angle α of the reference symbol 5 and the orientation plane 15 with respect of the half circle 14 is therefore shown on FIG. 7b.

In FIG. 7c, the vehicle presents a pitch up inclination (pivoting around the pitch axis) corresponding to an inclination with respect of the pitch axis P. A pitch angle φ of the reference symbol 5 and the orientation plane 15 with respect of the half circle 14 is therefore shown on FIG. 7c.

According to the invention, the method of presenting attitude and heading information of a vehicle, on a display to a viewer inside the given vehicle, comprises the steps of:
   using a 2D display,
   using data provided by an inertial reference system,
   using a computer and graphical software/algorithm for treating the data and defining graphical elements,
   depicting the graphical elements in 3D on the 2D display,
   and presenting the attitude and heading information on the 2D display by associating them to at least one graphical element.

By way of example, the method according to the invention consists of using roll and pitch data for the attitude information.

By way of another example, the method according to the invention consists of using also yaw data for the attitude information.

By way of preferred example, the method according to the invention consists of:
   depicting a first graphical element as the transparent sphere 4 representing an inertial reference system with respect of the vehicle, the sphere 4 comprising longitudinal 12 and lateral markings 13 on its surface, representing direction and orientation references, the upper half sphere 4a representing the sky and the lower half sphere 4b representing the ground,
   projecting movable attitude and heading information in response to variations in attitude or heading on the surface of the sphere 4, using a second graphical element which is fixed with respect of the vehicle, representing a 3D reference symbol of the vehicle and/or its main axes and/or its orientation plane 15, placing the reference symbol 5 in the sphere 4, and depicting the graphical elements in a vehicle external observer viewing mode.

By way of example, the method according to the invention consists of:

depicting at the equator of the sphere 4 the half circle 14 ranging away from the viewer representing an artificial horizon, and keeping the reference symbol 5 in the straight forward direction of the vehicle while moving the orientation plane 15 and the reference symbol 5 within the sphere 4 in order to display the angles between both and the half circle 14. This corresponds to the roll and pitch information.

By way of example, the method according to the invention consists of moving the orientation plane 15 within the sphere in order to display the angle between the straight forward direction of the vehicle and a longitudinal marking 12 of the sphere 4. This corresponds to the yaw information.

By way of example, the method according to the invention consists of using for the reference symbol 5 an additional half sphere placed inside the sphere 4 and whose plane surface constitutes the orientation plane 15 comprising a vehicle representation.

By way of example, the method according to the invention consists of depicting a deviation from a desired track by shading an area 18 of the sphere 4, ranging away from the viewer, lying between a first longitudinal marking 12 corresponding to the actual track or zero direction and a second longitudinal marking 12 which corresponds to the desired track.

By way of example, the method according to the invention consists of depicting the sphere combined with steering information of the vehicle with respect of power information or other flight information of the vehicle. For instance, alongside the sphere 4, steering information with respect of power settings can be projected. It is possible to provide information about the necessary pitch and roll attitude to achieve a certain performance, e.g. climb with a defined ROC, level flight at a defined speed.

By way of example, the method according to the invention consists of switching manually or automatically from one to another of the depicted 3D elements viewing mode and information to a conventional 2D artificial horizon representation or standard 2D projection mode.

By way of example, the method according to the invention is carried out on a helicopter. Other type or aircrafts, for instance fixed wings aircrafts, or spacecrafts, can also be steered with the help of the method according to the invention.

Unsurprisingly, the present invention is subject to several variations in terms of its implementation. Although several execution and implementation modes have been described, it is clear that identifying all possible modes exhaustively is inconceivable. It is, of course, possible to replace any feature or step described above with an equivalent feature or step and still remain within the scope of the present invention.

What is claimed is:

1. A method of presenting attitude and heading information of a vehicle on a 2D display to a viewer inside the vehicle, comprising the steps of:

using data provided by an inertial reference system, using a computer and graphical software for treating the data and defining 3D graphical elements, depicting the 3D graphical elements on the 2D display, presenting the attitude and heading information of the vehicle on the 2D display by associating the information to at least one 3D graphical element, depicting a first graphical element as a transparent sphere representing a fixed reference system with respect to the inertial reference system for the movement of the vehicle, the sphere including longitudinal and lateral markings on its surface representing direction and orientation references, an upper half sphere representing the sky, and a lower half sphere representing the ground, projecting movable heading information in response to variations in heading on the surface of the sphere, using a second graphical element which is fixed with respect of the vehicle, representing a 3D reference symbol of the vehicle and/or main axes of the vehicle and/or an orientation plane of the vehicle, placing the 3D reference symbol in the sphere, moving the 3D reference symbol inside the fixed sphere with regard to the vehicle's movement in the inertial reference system, depicting the graphical elements in a vehicle external observer viewing mode, and using for the 3D reference symbol an additional half sphere placed inside the sphere and whose plane surface constitutes the orientation plane comprising a vehicle representation.

2. The method according to claim 1, further comprising the step of using roll and pitch data for the attitude information.

3. The method according to claim 2, further comprising the step of using also yaw data for the attitude information.

4. The method according to claim 1, further comprising the step of:

depicting at the equator of the sphere a half circle ranging away from the viewer representing an artificial horizon, and keeping the sphere and its surface elements fixed to the inertial reference system while moving the reference symbol within the sphere in order to display the angles between the orientation plane and the half circle.

5. The method according to claim 4, further comprising the step of displaying a current heading aligned to the straight forward direction of the vehicle and to place longitudinal markings of the sphere.

6. The method according to claim 1, further comprising the step of depicting a deviation from a course by shading an area of the sphere, ranging away from the viewer, lying between a longitudinal marking corresponding to the actual track and a longitudinal marking corresponding the selected course.

7. The method according to claim 1, further comprising the step of depicting the sphere combined with steering information of the vehicle with respect of power information or other flight information of the vehicle.

8. The method according to claim 1, further comprising the step of switching manually or automatically from one to another of the depicted 3D elements viewing mode and information to a conventional 2D artificial horizon representation or standard 2D projection mode.

9. The method according to claim 1, further comprising the step of carrying out the method on a helicopter.

10. An artificial spatial attitude and heading indicator for a vehicle including a 2D display, an inertial reference system, a computer and a graphical software for treating data provided by the inertial reference system and for preparing elements and information to be displayed, wherein the graphical software is a part of an avionic system for carrying out these steps:

using the computer and graphical software for treating the data and defining 3D graphical elements, depicting the 3D graphical elements on the 2D display, presenting attitude and heading information of the vehicle on the 2D display by associating the information to at least one 3D graphical element, depicting a first graphical element as a transparent sphere representing a fixed reference system with respect to the inertial reference system for the movement of the vehicle, the sphere including longitudinal and lateral markings on its surface representing direction and orientation references, an upper half sphere representing the sky, and a lower half sphere representing the ground, projecting movable heading information in response to variations in heading on the surface of the sphere, using a second graphical element which is fixed with respect of the vehicle, representing a 3D reference symbol of the vehicle and/or main axes of the vehicle and/or an orientation plane of the vehicle, placing the 3D reference symbol in the sphere, moving the 3D reference symbol inside the fixed sphere with regard to the vehicle's movement in the inertial reference system, depicting the graphical elements in a vehicle external observer viewing mode, and using for the 3D reference symbol an additional half sphere placed inside the sphere and whose plane surface constitutes the orientation plane comprising a vehicle representation.

* * * * *